United States Patent [19]
Oishi

[11] 4,119,282
[45] Oct. 10, 1978

[54] MAGNETIC TAPE MAGAZINE
[75] Inventor: Kengo Oishi, Odawara, Japan
[73] Assignee: Fuji Photo Film Co., Ltd., Minami-ashigara, Japan
[21] Appl. No.: 810,856
[22] Filed: Jun. 28, 1977
[30] Foreign Application Priority Data
Jun. 30, 1976 [JP] Japan .............................. 51-86607[U]
[51] Int. Cl.[2] ............................................ G11B 23/10
[52] U.S. Cl. .................................................. 242/199
[58] Field of Search ................ 242/199, 200, 198, 194, 242/197, 76; 360/132, 96, 93

[56] References Cited
U.S. PATENT DOCUMENTS
3,495,787  2/1970  Wallace ................................ 242/199
3,934,842  1/1976  Posso .................................... 242/199

FOREIGN PATENT DOCUMENTS
1,126,634  3/1962  Fed. Rep. of Germany ........... 242/199
2,224,442 11/1973  Fed. Rep. of Germany ........... 242/199

Primary Examiner—George F. Mautz
Attorney, Agent, or Firm—Harold L. Stults

[57] ABSTRACT

In a magnetic tape magazine of small size containing a thin tape for long play, one of a pair of guide walls is provided between a fixed guide pin and a rotatable guide roller on either side of the tape retaining section of the interior space of the magazine. The guide walls are made of non-magnetizable material and have a smooth flat surface to smoothly guide the tape and prevent the tape from winding around the rotatable guide rollers or being distorted while being fed in a recording or reproducing operation. A partition is provided in the tape magazine to divide the interior of the magazine into a tape retaining section and a recording and reproducing section. Between both ends of the partition and the rotatable guide rollers are provided additional guide walls.

11 Claims, 3 Drawing Figures

MAGNETIC TAPE MAGAZINE

BACKGROUND OF THE INVENTION

1. Field of the Invention

This invention relates to a magnetic tape magazine, and more particularly to an improvement in a tape guiding structure in a magnetic tape magazine of the type generally called a "magnetic tape cassette".

2. Description of the Prior Art

In the magnetic tape magazine of the type called a tape cassette, a pair of magazine halves are combined to form a tape magazine in which a thin magnetic tape is retained and guided along a tape passage made by a number of fixed pins and guide rollers. Since the tape recorders in which the tape cassettes are loaded have recently become very compact in size and light in weight, the tape recorders are often handled roughly. Therefore, it has recently become necessary to make the tape cassettes resistance to vibration or rough handling, which means that the tape in the cassettes should be stably held in the tape passage and protected from vibration or rough handling. Particularly, the tape should be assured of running smoothly through the passage and should be prevented from being bent.

When the magnetic tape cassette is subjected to vibration or rough handling, the tape is loosened. Once the tape is loosened, the tape is apt to be wound around the guide rollers or bent when the tape starts to run in a tape recorder since a part of the tape engaged in the magnetic recording head mechanism in the tape recorder is fed faster than the part wound on the convolutions on the tape feed-out core or the tape take-up core. Particularly, in the conventional tape cassette, the tape is apt to be bent or wound on guide rollers in the cassette where the tape runs between a pair of fixed guide pins located adjacent the tape convolutions and a pair of guide rollers located adjacent the guide pins.

SUMMARY OF THE INVENTION

In view of the above described drawbacks inherent in the conventional tape magazine, it is the primary object of the present invention to provide a magnetic tape magazine in which the tape is prevented from being bent or wound on the guide rollers therein even when the tape magazine is roughly handled.

Another object of the present invention is to provide a magnetic tape magazine in which the tape is prevented from being wrinkled even when the tape magazine is roughly handled and the tape is loosened.

The above objects are accomplished by providing a pair of guide walls in parallel to and in the vicinity of the tape between the pair of guide pins and the pair of guide rollers in the tape magazine.

DESCRIPTION OF THE PREFERRED EMBODIMENTS

Figure 1:
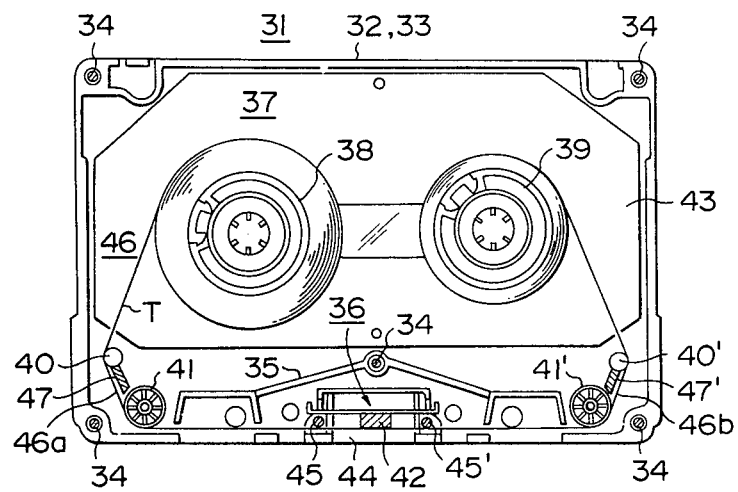
FIG. 1 is a plan view showing the interior of the magnetic tape magazine in accordance with the present invention.

Now a preferred embodiment of the present invention will be described in detail with reference to the drawing. Referring to FIG. 1, the magnetic tape magazine of this invention is comprised of a pair of magazine case halves 32 and 33 only one of which is illustrated. The pair of magazine case halves 32 and 33 are combined together with combining means 34 such as screw and nut or adhesives. The interior of the magazine is provided with a partition 35 which divides the interior into a recording and reproducing section 36 and a tape retaining section 37. Within the tape retaining section 37 are provided symmetrically a pair of tape cores 38 and 39, a pair of fixed guide pins 40, 40' and a pair of rotatable guide rollers 41, 41'. A friction sheet 43 is provided between the inner wall of the case half 32 and the pair of tape cores 38, 39. When one of the tape cores acts as a tape feed-out core, the other acts as a tape take-up core, the functions of the two cores being reversible.

Within the recording and reproducing section 36 is provided a pressure pad 42 which pushes the non-magnetic side face of the tape T in the section 36 against a magnetic head of a tape recorder. Further, the case halves 32, 33 are provided with a plurality of apertures 44 on the front face of the case facing the tape recording mechanism. A pair of fixed pins 45, 45' are provided one on either side of the pad 42.

The above described structure is quite the same as that of the conventional tape magazine. The tape magazine in accordance with the present invention is further provided with a pair of guide walls 47 and 47' extending in parallel to the tape T between the fixed guide pins 40, 40' and the pair of guide rollers 41, 41'. The guide walls 47 and 47' are fixed to the case half 32 and extend perpendicularly thereto. Further, the guide walls 47 and 47' are located inside the tape passage so that they prevent the magnetic tape T from going into the space between the guide pins 40, 40' and the guide rollers 41, 41' or from being wound around the guide rollers 41, 41'. Thus, the parts 46a, 46b of the magnetic tape T running between the guide pins 40, 40' and the guide rollers 41, 41' are prevented from advancing into the space therebetween.

Figure 2:
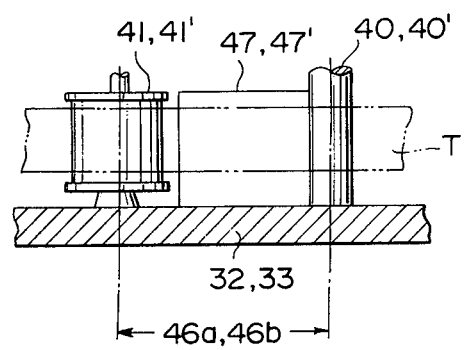
FIG. 2 is a fragmentary enlarged view showing the guide pin, the guide roller and the guide wall provided therebetween in accordance with an embodiment of the present invention.

As shown in enlarged scale in FIG. 2, the guide walls 47, 47' are provided to be in contact or nearly in contact with the fixed guide pins 40, 40' at one end thereof and out of contact with the rotatable guide rollers 41, 41' at the other end thereof. The guide walls 47, 47' are made of the same material as that of the case halves 32, 33 or may be made of other material which is preferably non-magnetizable and has a smooth surface. For instance, the guide walls 47, 47' may be made of plastics such as polyacetal, polycarbonate, ABS resin or metal such as stainless steel.

Figure 3:
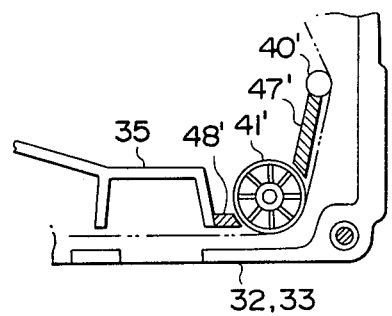
FIG. 3 is a fragmentary enlarged plan view showing the guide pin, the guide roller and the guide walls provided therebetween in accordance with another embodiment of this invention.

When the space between the guide rollers 41, 41' and the ends of the partition 35 is large, it is preferable that a pair of additional guide walls 48 and 48' be provided therebetween as shown in FIG. 3. Thus, the tape T is effectively prevented from being wound around the guide rollers 41 and 41' in whichever direction the tape T may be fed. The additional guide walls 48, 48' are also made of non-magnetizable material and have a smooth flat surface. One end of the additional guide walls 48, 48' is fixed to the end of the partition 35 and the other end thereof is spaced from the rotatable guide rollers 41, 41'.

The present invention will be described with reference to an example thereof in comparison with the conventional tape magazine.

EXAMPLE

A magnetic tape having a thickness of 14 microns consisting of 9 microns of a polyethylene terephthalate film base and 5 microns of a magnetic coating layer, a width of 3.8mm and a length of 135mm was used. The tape was loaded in a magnetic tape cassette as shown in FIG. 2. The tape magazine was subjected to a vibration having an amplitude of 5mm and a frequency of 20Hz for one minute. Then, the tape magazine was loaded into a magnetic tape recorder (Hitachi Model LD-3500) and the tape was fed at the speed of 4.8cm/sec. The winding of the tape around the rotatable guide roller when the tape was started and the distortion of the tape which resulted after the tape was fed repeatedly 50 times were checked. The results showed that the tape did not wind around the guide roller and the tape was not distorted at all.

COMPARISON

The same magnetic tape as that used in the above example was loaded in a conventional tape magazine of the same kind of the magazine as shown in FIG. 2. The tape magazine was subjected to the same vibration and the same tests as those described in the above example. The results showed that the rate of occurrence of winding of the tape around the rotatable guide roller when the tape was started was about 5% and one side edge of the tape was elongated.

I claim:

1. A magnetic tape magazine in which a tape passage is formed at least partly by means of fixed guide pins and rotatable guide rollers, wherein the improvement comprises a guide wall having a smooth flat surface and provided in parallel to the tape fed through said tape passage, said guide wall being normally spaced slightly inwardly from the tape passage, thereby preventing the tape from winding around the guide roller.

2. A magnetic tape magazine comprising a pair of case halves combined together, a pair of tape winding cores rotatably provided therein, a pair of fixed guide pins provided adjacent to said cores respectively, a pair of rotatable guide rollers provided adjacent to said fixed guide pins respectively at certain distances therefrom, and a magnetic tape guided along said fixed guide pins and said rotatable guide rollers from one of said cores to the other, wherein the improvement comprises a pair of guide walls having a smooth flat surface and provided one between each of said pair of fixed guide pins and the associated one of said pair of rotatable guide rollers, said guide walls each being normally spaced slightly inwardly from the tape running between the fixed guide pin and the rotatable guide roller extending in parallel to the tape, thereby preventing the tape from winding around the guide roller.

3. A magnetic tape magazine as defined in claim 2 wherein said guide walls are made of non-magnetic material.

4. A magnetic tape magazine as defined in claim 2 wherein one end of each of said pair of guide walls is fixed to the associated one of said pair of fixed guide pins.

5. A magnetic tape magazine comprising a pair of case halves combined together to form an interior space therebetween, a partition provided in the space to divide the space into a recording and reproducing section including front apertures facing to a magnetic recording head of a tape recorder in which the tape magazine is to be loaded and a tape retaining section, a pair of tape winding cores rotatably provided in said tape retaining section on which a magnetic tape is to be wound, a pair of fixed guide pins provided in said tape retaining section adjacent to said cores respectively, a pair of rotatable guide rollers provided in said tape retaining section adjacent to said fixed guide pins respectively with certain distances therebetween, and a magnetic tape passage formed by said partition in said recording and reproducing section, said partition extending between said rotatable guide rollers, wherein the improvement comprises a pair of guide walls provided one between each of said pair of fixed guide pins and the associated one of said pair of rotatable guide rollers in parallel to a tape passage formed therebetween, said guide walls having a smooth flat surface and being normally spaced slightly inwardly from the tape passage, thereby preventing the tape from winding around the guide roller.

6. A magnetic tape magazine as defined in claim 5 wherein said guide walls are made of non-magnetic material.

7. A magnetic tape magazine as defined in claim 5 wherein one end of each of said pair of guide walls is fixed to the associated one of said pair of fixed guide pins.

8. A magnetic tape magazine as defined in claim 7 wherein the other end of each of said pair of guide walls is slightly separated from the associated one of said pair of rotatable guide rollers.

9. A magnetic tape magazine as defined in claim 5 further comprising a pair of additional guide walls provided between each end of said partition and the associated one of said rotatable guide rollers in parallel to said magnetic tape passage.

10. A magnetic tape magazine as defined in claim 9 wherein said pair of additional guide walls are made of non-magnetic material and have a smooth flat surface.

11. A magnetic tape magazine as defined in claim 10 wherein the other end of each of said pair of additional guide walls is slightly separated from the associated one of said rotatable guide rollers.

* * * * *